United States Patent
Velten et al.

(12)

(10) Patent No.: US 6,855,752 B2
(45) Date of Patent: Feb. 15, 2005

(54) POLYMERS FOR CEMENT DISPERSING ADMIXTURES

(75) Inventors: Ulf Velten, Zürich (CH); Ueli Sulser, Oberengstringen (CH); Jürg Widmer, Zürich (CH); Irene Schober, Zürich (CH); Theodor A. Bürge, Geroldswil (CH)

(73) Assignee: Sika Schweiz AG, Zurich (CH)

( * ) Notice: Subject to any disclaimer, the term of this patent is extended or adjusted under 35 U.S.C. 154(b) by 233 days.

(21) Appl. No.: 09/819,793

(22) Filed: Mar. 29, 2001

(65) Prior Publication Data

US 2002/0002218 A1 Jan. 3, 2002

(30) Foreign Application Priority Data

Mar. 29, 2000  (EP) ............................................. 00106694

(51) Int. Cl.$^7$ .................................................. C08F 8/32
(52) U.S. Cl. ........................ 524/5; 524/425; 525/329.1; 525/330.1; 525/374; 525/375; 525/379; 525/384
(58) Field of Search ........................... 525/329.1, 330.1, 525/374, 375, 379, 384; 524/5, 425

(56) References Cited

U.S. PATENT DOCUMENTS

| | | | |
|---|---|---|---|
| 5,707,445 A | | 1/1998 | Yamato et al. .............. 106/802 |
| 5,840,114 A | * | 11/1998 | Jeknavorian et al. ....... 106/802 |
| 6,139,623 A | * | 10/2000 | Darwin et al. .............. 106/823 |
| 6,258,162 B1 | * | 7/2001 | Kawakami et al. ......... 106/810 |
| 6,294,015 B1 | * | 9/2001 | Yamashita et al. .......... 106/802 |
| 6,388,038 B1 | * | 5/2002 | Hirata et al. ................ 526/320 |
| 6,569,924 B2 | * | 5/2003 | Shendy et al. .................. 524/5 |
| 2002/0111399 A1 | * | 8/2002 | Bury et al. ..................... 524/2 |

FOREIGN PATENT DOCUMENTS

| | | |
|---|---|---|
| EP | 0 753 488 A2 | 1/1997 |
| EP | 0 792 850 A1 | 9/1997 |
| WO | WO 95/09821 | 4/1995 |
| WO | WO 97/00898 | 1/1997 |
| WO | WO 97/03929 | 2/1997 |

* cited by examiner

*Primary Examiner*—Bernard Lipman
(74) *Attorney, Agent, or Firm*—Burns, Doane, Swecker & Mathis, LLP (57) ABSTRACT

Polymers for cement dispersing admixtures, which show different performing properties in concrete are described. All polymers are based on a composition of reactants, namely a) a poly(acrylic acid), b) a polyalkyleneglycol-monoalkylether and, optionally c) a α-amino-polyalkylene-glycol-ω-alkylether and/or d) a primary or secondary amine. By keeping the composition of reactants constant and varying only the reaction time, polymers with different properties can easily be achieved. Such polymers are suitable for pre-cast, readymix or for increasing workability over time, just depending on reaction time. Polymers of the invention can be used as single polymer or in polymer blends. For this, the kinetics of the used polymer analogous condensation reaction was intensively studied. Additionally, the benefit of amines as reactant regarding stability and hydrolysis velocity of cleavable side groups was investigated.

49 Claims, 2 Drawing Sheets

POLYMERS FOR CEMENT DISPERSING ADMIXTURES

CROSS REFERENCE TO RELATED APPLICATIONS

This application claims the priority of European Patent application 00 106 694.3, filed Mar. 29, 2000, the disclosure of which is incorporated herein by reference in its entirety.

BACKGROUND OF THE INVENTION

On today's construction sites superplasticizers find wide spread use for improving concrete. In modern constructions in housing or civil engineering, which are heavy reinforced, prestressed or require high final strength and durability, concrete coming from ready mix plants or concrete which is mixed on job sites must fulfill sometimes extraordinary high requirements regarding water reduction, workability, compactation, durability and strength.

In former years, water reducers from mid to high range based on lignin, naphthalene sulfonic acid condensates, melamine formaldehyde condensates or copolymers based on maleic acids found intensive use. These water reducers were useful to reduce water content of fresh concrete and, thus, to enhance workability, fluidity ("slump"), durability and strength.

However, as from construction site the standards regarding properties of fresh and/or hardened concrete became more and more sophisticated, this kind of polymers were inappropriate if high water reduction was required, because this could only be achieved by adding high dosages of water reducer, which, however, led to undesired effects like strong retardation, stiffening and dramatically loss of fluidity (called "slump loss").

In recent years, a new kind of superplasticizers based on poly(acrylic acid) and polyethyleneglycol came up. Said superplasticizers were no longer linear polyelectrolyts but showed a comb like structure. Superplasticizers with this new structure caused a higher water reduction than the water reducers used before and were accompanied by a much lower retardation. Thus, this kind of new polymers was useful for modern construction sites with high standards because low dosages could be used with improved workability of fresh concrete and improved durability and final strength of hardened concrete.

Dispersants with the above mentioned features, obtained by copolymerizing (meth)acrylic acid or a salt thereof with (alkoxy)polyalkylene glycol mono(meth)acrylic ester are e.g. disclosed in EP 0 753 488.

Polymeric additives imparting to the wet cement composition the above mentioned advantages, and in addition comprising air detraining functional side chains, are disclosed in WO 97/00898.

However, despite of the improvement regarding water reduction and slump loss, it is still a challenge to fit to the various requirements coming form construction sites worldwide. This is due to different climates, cements, aggregates, cement replacing fillers etc., but also due to a wide spread application field like precast, ready mix, self compacting concrete, shotcrete, on site concrete etc., where the admixtures are faced some times with completely different demands.

Hence, to fit every request coming from construction sites, it is often necessary to use blends of polymers as water reducing admixtures. Consequently, a pool of differently performing polymers, i.e. polymers with high or moderate water reduction, with constant or increasing slump flow, with more or less retardation, or polymers with special features like set accelerating, and/or corrosion inhibiting must be available.

The polymer analogous reaction of carboxylic groups containing polymers with polyalkyleneglycol-monoalkylether, α-amino-polyalkyleneglycol-ω-alkylether or other amines is described in U.S. Pat. No. 5,728,207, U.S. Pat. No. 5,840,114 and WO-A-98/31643. However, the polymers disclosed in the above mentioned state of the art documents do not fit all various requests coming from construction sites worldwide.

Thus, it is desirable to provide improved polymers that are obtainable by an easy and convenient synthesis method, as well as such a method which gives the feasibility to establish a pool of differently performing polymers based on few raw materials and only one synthetical approach, but with different properties like high water reduction, constant slump flow or increasing slump flow.

BRIEF DESCRIPTION OF THE INVENTION

Surprisingly, it has now been found that the reactions described in U.S. Pat. No. 5,728,207, U.S. Pat. No. 5,840,114 and WO-A-98/31643, can be improved such that it is suitable to synthesize a variety of polymers, with completely different properties, for e.g. precast, ready mix or for workability increasing applications, by varying the reaction time and improving the amount of amide/imide structures in said polymers obtainable by the inventive method.

Thus, it was one object of the present invention to provide differently performing, modified poly(acrylates) which are all obtainable by one convenient synthesis and by one composition of reactants, whereby only the reaction time is varied. This method provides the feasibility to synthesize in a very convenient way differently performing polymers for precast, for readymix, or for slump keeping applications.

Said polymers according to the present invention are obtainable by reacting a poly(acrylic acid) A-1 with endgroups resulting from initiators and/or chain transfer agents that are inert for condensation reactions, said poly(acrylic acid) A-1 having a number average molecular weight of from 500 to 20'000

A-1 with o molar equivalents of a monofunctional polyalkyleneglycol-monoalkylether, represented by formula B-1

$$HO-(A-O-)_r-(B-O-)_sR^1 \qquad B\text{-}1$$

and optionally
with p molar equivalents of a monofunctional α-amino-polyalkyleneglycol-ω-alkylether, represented by formula C-1

$$H_2N-(A-O-)_t-(B-O-)_uR^1 \qquad C\text{-}1$$

and/or, optionally
with q molar equivalents of a primary or secondary amine, represented by formula D-1

D-1 wherein R represents a hydrogen atom or a methyl group, or mixture thereof (wherever the term "or a mixture thereof" occurs in this specification in connection with the definition of substituents, it means that the compound of a specific formula can comprise several compounds of said formula only differing in the respective substituent);

M represents a hydrogen atom, a $C_1$-$C_5$-alkyl rest or an alkali metal, an alkaline earth metal or other two or three valent metal atoms, an ammonium or organic ammonium group (such as e.g. an alkyl and/or alkanol substituted ammonium group, in particular $C_1$-$C_4$-alkyl and/or $C_1$-$C_4$-alkanol substituted ammonium), or a mixture thereof;

each $R^1$ independently from each other is a $C_1$-$C_4$ alkyl rest, A and B represent alkylene groups with 2-4 C-atoms, the mixture of (A-O) and (B—O) may be formed by either random addition or block addition, and (A-O)≠(B—O);

$R^2$ and $R^3$ independently from each other represent a hydrogen atom, or an aliphatic, cycloaliphatic, araliphatic or aromatic rest, or $R^2$ and $R^3$ may together with the nitrogen atom to which they are bound form a morpholine or imidazole ring system, or another ring systems containing at least on hetero atom like nitrogen, sulfur or oxygen; or $R^2$ and $R^3$ independently from each other represent oxyalkylene groups of the structure $R^5$-$(O-R^6)_v$-, wherein $R^5$ represents a $C_1$-$C_4$ alkyl rest and $O-R^6$ represents an oxyalkylene group with 2 to 4 carbon atoms, whereby within the same structure $R^5$-$(O-R^6)_v$-, $O-R^6$ can represent more than one kind of oxyalkylene group, wherein the mixture may be formed by either random addition or block addition;

wherein a:o:p:q=1:(0.1-0.95):(0-0.6):(0-0.6), preferably a:o:p:q=1:(0.1-0.95):(0-0.3):(0-0.3), more preferably a:o:p:q=1:(0.1-0.95):(0-0.1):(0-0.1), still more preferably a:o:p:q=1:(0.1-0.95):(0-0.05):(0-0.05), even more preferably a:o:p:q=1:(0.1-0.95):(0-0.02):(0-0.02), and most preferably a:o:p:q=1:(0.1-0.95):(0-0.01):(0-0.01), and wherein p+q<0.9, preferred p+q<0.6, more preferred p+q<0.3, still more preferred p+q<0.1, even more preferred p+q<0.05, much more preferred p+q<0.02, and most preferred p+q<0.01, and o+p+q<a;

r, s, t, u and v independently represent integers from 0-250;

r+s>1;

t+u>1;

at elevated temperatures, whereby the reaction can be stopped at different reaction times to get polymers with different properties, whereby said reaction times are determined dependent on the reaction kinetics influenced by the ratio of A-1, B-1 and optionally C-1 and/or D-1 and the temperature, whereby said reaction kinetics are determined by measuring the decrease of the acid number over the time, whereby said reaction is stopped, I. at a high slope of decrease of the acid number over the time resulting in polymers with a high initial water reduction and a decreasing slump flow over the time or II. at a medium slope of decrease of the acid number over the time resulting in polymers with a high or medium initial water reduction and a constant slump flow over the time or III. at a small slope of decrease or no decrease of the acid number over the time resulting in polymers with a medium or low initial water reduction and an increasing slump flow over the time.

The determination of the kinetics of the reaction by measuring the decrease of the acid number over the time has of course not to be performed with any reaction but can be determined once and used for later reactions with the same characteristics.

In order to clearly distinguish Areas I, II, and III, it is furthermore advisable to determine for a specific composition of starting materials and reaction conditions the relevant properties of the polymer at different reaction times.

Where in the scope of the present invention high water reduction is mentioned, this means a water reduction of >20%. Values between 10% and 20% are termed medium water reduction, and values below about 10% low water reduction.

In a preferred embodiment of the present invention, in the ratio a:o:p:q, p+q≠0, preferably 0<p+q<0.9, more preferably 0<p+q<0.6, even more preferably 0 <p+q<0.3, still more preferably 0<p+q<0.1, even more preferably 0<p+q<0.05, still more preferably 0<p +q<0.02, and most preferably 0<p+q<0.01, whereby in the case of p+q≠0 the lower limit is about 0.001.

One preferred embodiment of the present invention comprises a polymer in which at least 0.5 mole-%, more preferred 5-100 mole-% and most preferred 50-100 mole-% of the formula B-1 is represented by a structure in which A represents an alkylene group with 2 C-atoms and s=0, or in which B represents an alkylene group with 2 C-atoms and r=0.

Another preferred embodiment of the present invention comprises a polymer in which at least 0.5 mole-%, more preferred 5-100 mole-% and most preferred 50-100 mole-% of the formula C-1 is represented by a structure in which A represents an alkylene group with 2 C-atoms and u=0, or in which B represents an alkylene group with 2 C-atoms and t=0.

Still another preferred embodiment of the present invention comprises a polymer in which $O-R^6$ represents at least 0.5 mole-%, more preferred 5-100 mole-% and most preferred 50-100 mole-% of an oxyalkylene group with 2 C-atoms.

The modified acrylic polymers synthesized according to the present invention have dispersing, slump keeping or slump increasing properties, whereby the level of said properties can be determined by just varying the reaction time. They are composed of specific molar parts of at least two, preferably three or four constituent units selected from the group given by formulas A, B, C, and D, namely

A m molar parts of

B o molar parts of

C q molar parts of

D p molar parts of wherein R represents a hydrogen atom or a methyl group, or a mixture thereof;

M represents a hydrogen atom, a $C_1$-$C_5$-alkyl rest or an alkali metal, an alkaline earth metal or other two or three valent metal atoms, an ammonium or organic ammonium group (such as e.g. an alkyl and/or alkanol substituted ammonium group, in particular $C_1$-$C_4$-alkyl and/or $C_1$-$C_4$-alkanol substituted ammonium), or a mixture thereof;

each $R^1$ independently from each other is a $C_1$-$C_4$ alkyl rest, A and B represent alkylene groups with 2-4 C-atoms, the mixture of (A-O) and (B-O) may be formed by either random addition or block addition, and (A-O)≠(B—O);

$R^2$ and $R^3$ independently from each other represent a hydrogen atom, or an aliphatic, cycloaliphatic, araliphatic or aromatic rest, or $R^2$ and $R^3$ may together with the nitrogen atom to which they are bound form a morpholine or imidazole ring system, or another ring systems containing at least one hetero atom like nitrogen, sulfur or oxygen; or $R^2$ and $R^3$ independently from each other represent oxyalkylen groups of the structure $R^5$-$(O-R^6)_v$-, wherein $R^5$ represents a $C_1$-$C_4$ alkyl rest and O-$R^6$ represents an oxyalkylene group with 2 to 4 carbon atoms, whereby within the same structure $R^5$-$(O-R^6)_v$-, O-$R^6$ can represent more than one kind of oxyalkylene group, wherein the mixture may formed by either random addition or block addition;

r, s, t, u and v independently represent integers from 0-250;

r+s>1;

t+u>1;

m, o, p, q are numerical values representing the molarity of the constituent units A, B, C and D present in the polymers, in a proportion of m:o:p:q=(0.05-0.9):(0.1-0.95):(0-0.6):(0-0.6), preferred m:o:p:q=(0.05-0.9):(0.1-0.95):(0-0.3):(0-0.3), more preferred m:o:p:q=(0.05-0.9):(0.1-0.95):(0-0.1):(0-0.1), still more preferred m:o:p:q=(0.05-0.9):(0.1-0.95):(0-0.05):(0-0.05), even more preferred m:o:p:q=(0.05-0.9):(0.1-0.95):(0-0.02):(0-0.02), and most preferred m:o:p:q=(0.05-0.9):(0.1-0.95):(0-0.01):0-0.01), and wherein p+q<0.85, more preferred p+q<0.6, still more preferred p+q<0.3, even more preferred p+q<0.1, much more preferred p+q<0.05, very much more preferred p+q<0.02, and most preferred p+q<0.01, such, that m+o+p+q=1.

In a preferred embodiment, in the ratio m:o:p:q, p+q≠0, preferably 0<p+q<0.85, more preferably 0<p +q<0.6, still more preferably 0<p+q<0.3, even more preferably 0<p+q<0.1, much more preferably 0<p+q<0.05, very much more preferably 0<p+q<0.2, and most preferably 0<p+q<0.01, whereby the lower limit of p+q ≠0 preferably is about 0.001.

Another preferred embodiment of the present invention comprises a polymer in which at least 0.5 mole-%, more preferred 5-100 mole-% and most preferred 50-100 mole-% of the formula B is represented by a structure in which A represents an alkylene group with 2 C-atoms and s=0, or in which B represents an alkylene group with 2 C-atoms and r=0.

Another preferred embodiment of the present invention comprises a polymer in which at least 0.5 mole-%, more preferred 5-100 mole-% and most preferred 50-100 mole-% of the formula C is represented by a structure in which A represents an alkylene group with 2 C-atoms and u=0, or in which B represents an alkylene group with 2 C-atoms and t=0.

Another preferred embodiment of the present invention comprises a polymer in which O-$R^6$ represents at least 0.5 mole-%, more preferred 5-100 mole-% and most preferred 50-100 mole-% of an oxyalkylene group with 2 C-atoms.

In another preferred embodiment, the modified acrylic polymers have a number average molecular weight of from 4000 to 100'000.

It was found, that the poly(acrylic acid) or its $C_1$-$C_5$-alkyl ester, or its salt has preferably a number average molecular weight of from 1'000 to 10'000. Furthermore, the poly (acrylic acid) must be synthesized in a way, that the end-groups of the poly(acrylic acid), which are resulting form initiators and/or chain transfer agents, are inert for reactions like acid catalyzed condensation reactions. This means, that the endgroups of one single modified acrylic polymer must not react with another single modified acrylic polymer in a way, which causes crosslinking.

The poly(acrylic acid) may be fully or partly neutralized before or after the polymer analogous reaction with an alkaline substance. Examples for this alkaline substance are metal hydroxides like alkali metal hydroxides and alkaline earth metal hydroxides, aluminum hydroxides or oxide hydroxides, tin or zinc compounds, ammonia, alkyl amines or hydroxyalkyl amines.

In the scope of the invention it was found that modified acrylic polymers are preferably obtained by reacting the components A-1, B-1 and/or, optionally C-1 and/or D-1 in the presence of sulfuric acid or p-toluene sulfonic acid as a catalyst and maintained at a temperature of about 140° C. to 250° C., most preferred 150° C. to 200° C.

Furthermore, it was found that in the polymer analogous condensation reaction according to this invention, the separation of water arising during the esterification, amidization or imidization, can be done either by blowing a gas stream over the reaction melt, or by applying a vacuum, or by using inert organic solvents as carrier. Suitable inert organic solvents are such solvents that give an azeotropic mixture with water and which have a boiling temperature of about 50° C. to 300° C., preferably 80° C. to 300° C., most preferably 100° C. to 300° C. Inert organic solvents can support the polymer analogous condensation process at the beginning and/or during the reaction. Inert organic solvents can be aliphatic, cycloaliphatic, araliphatic or aromatic compounds, or mixtures thereof.

In other preferred embodiments reactant B-1 and C-1 independently from each other have a number average of weight of from 250 to 10'000.

Studying the kinetical behavior of the polymer analogous reaction towards modified poly(acrylate)s, it was surprisingly found that, depending on the reaction time, completely differently performing polymers can be achieved. Said synthesis for differently performing polymers that are suitable for use in dispersing admixtures is easily feasible using only one reactor and one favorite composition of reactants.

The kinetic behavior of the polymer analogous reaction of poly(acrylic acid)s A-1 with polyalkyleneglycolmonoalkylether B-1, α-amino-polyalkyleneglycol-ω-alkylether C-1 and primary or secondary amines D-1 can be monitored by determination of the acid number (mg KOH/g) over the time by taking samples at certain times.

Figure 1:
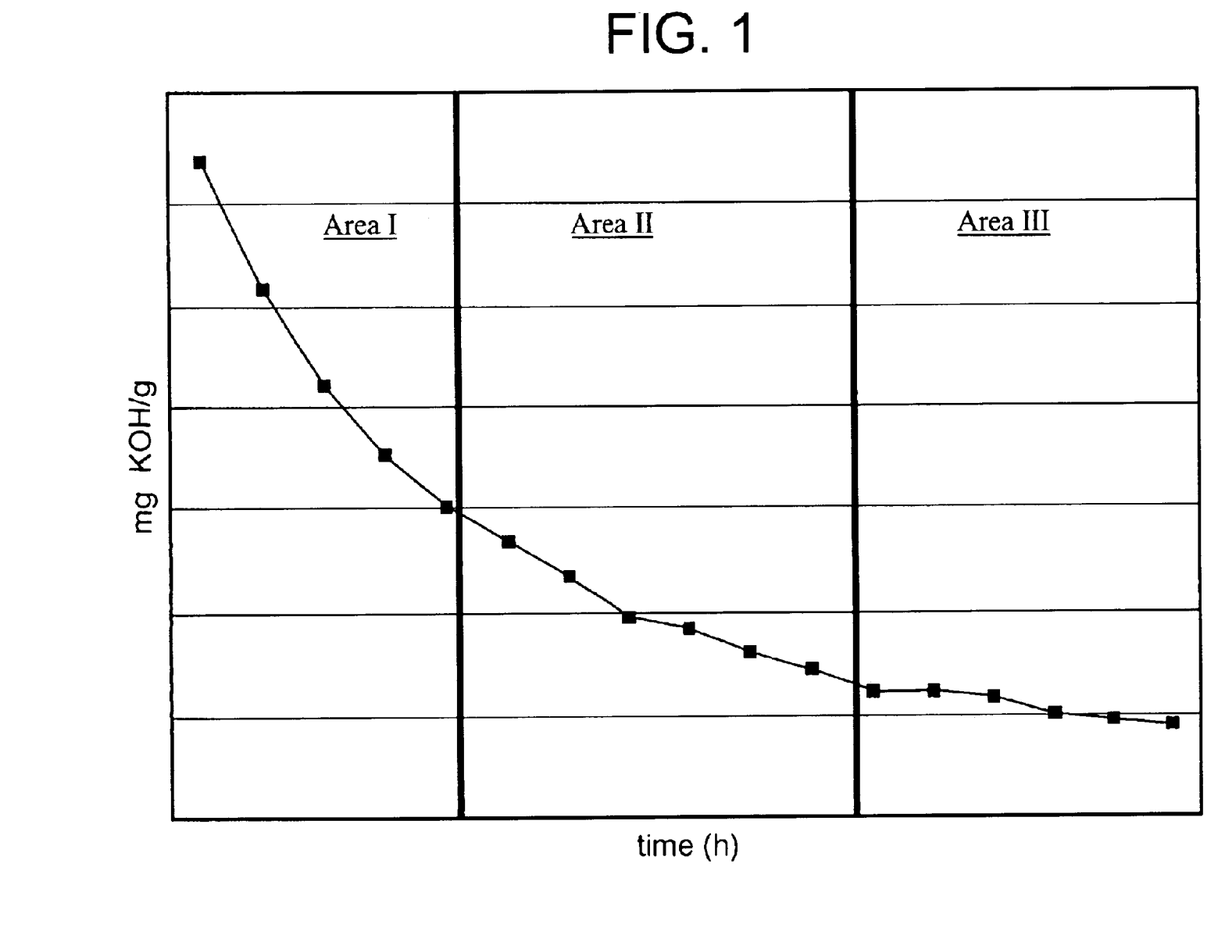
FIG. 1 shows the kinetic behavior of the syntheses of polymer example E 4.

FIG. 1 represents the kinetical behavior of the syntheses of polymer example E 4, which shows a typical behavior for all syntheses:

Three different Areas I, II and III can be distinguished. Area I is characterized in that the slope of decrease of the acid number is high, Area II is characterized in that the slope of decrease of the acid number is medium and Area III is characterized in that the slope of decrease of the acid number is from low to no decrease. In particular, it was found, that one composition of reactants, which can be varied according to mentioned claims, results in polymers with completely different performance in concrete depending on the reaction time at a specific elevated temperature.

One specific embodiment of this invention are e.g. polymers obtainable according to Area I that show a high initial water reduction and are suitable for precast. Another specific embodiment are polymers obtainable according to Area II that show a high or medium initial water reduction and a constant slump flow over the time. Such polymers are suitable for readymix. Jet another embodiment are polymers synthesized according to Area III that show a medium or low initial water reduction and an increasing slump flow over the time. Such polymers are suitable for slump flow increasing applications. Properties of polymers according to Area I, II and III can be further adapted to specific needs by varying the composition of reactants.

Wherever here polymers obtainable according to a specific area or polymers according to a specific area are mentioned, this means polymers that are obtainable by stopping the reaction in one of the Areas I, II, or III.

The slump increasing effect of modified poly(acrylic acid)s according to Area III is due to the hydrolysis of cleavable ester groups under cementitious conditions, whereby the most important condition is a high pH value. It was found, that the hydrolysis behavior of cleavable side groups of the inventive polymers can be influenced and controlled in an easy way by adapting the composition of the reactants in the polymers, most preferably by variation of reactants C-1 and/or D-1.

Figure 2:
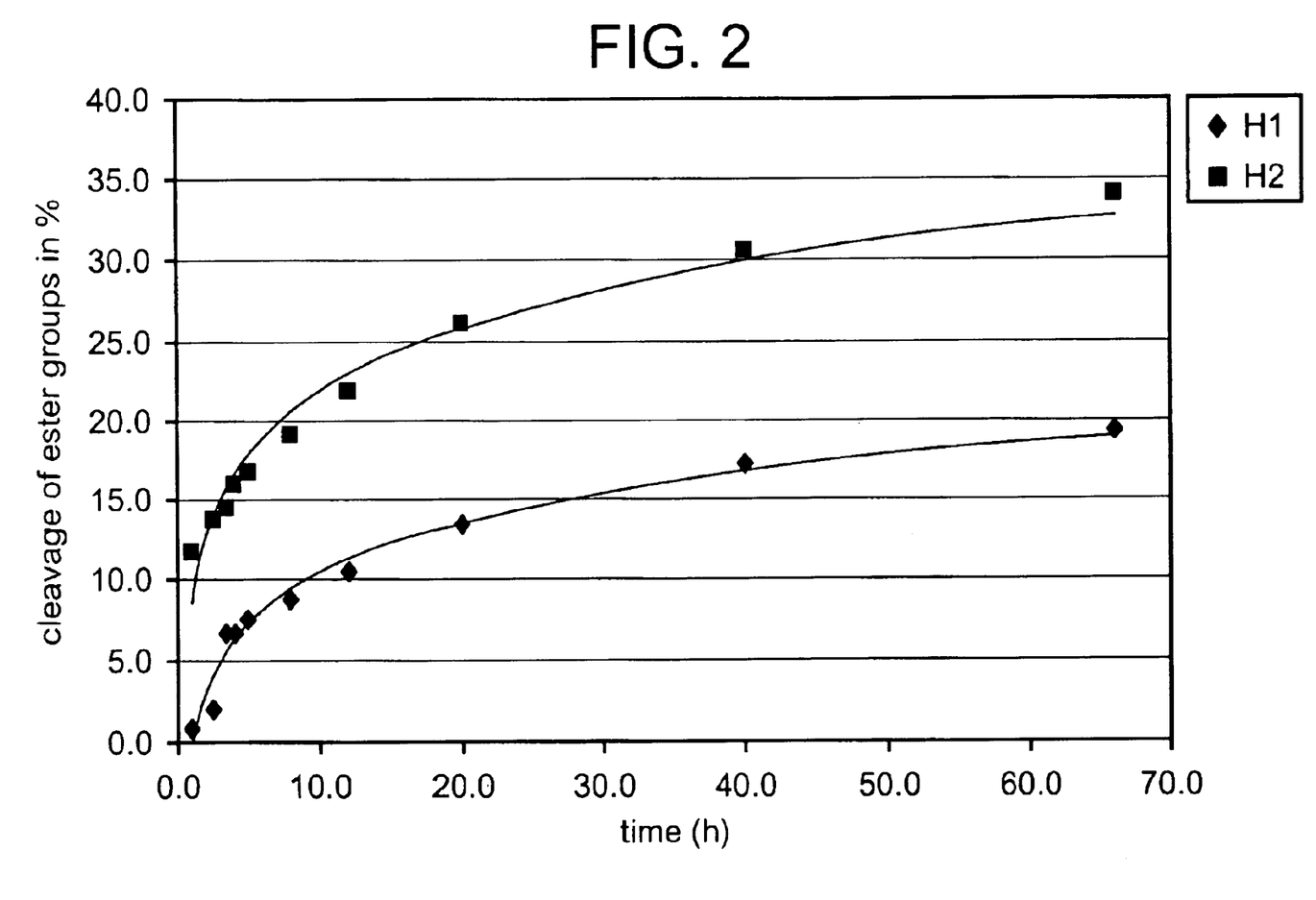
FIG. 2 shows the hydrolysis of cleavable ester groups of polymer with (H1) and without (H2) reactant D-1.

The hydrolysis kinetics can be determined by adding NaOH to a solution of modified poly(acrylic acid) and monitoring the cleavage of the ester groups by using a pH-indicator. FIG. 2 shows inventive polymers with reactant D-1 and without reactant D-1, which show a significantly different hydrolyzation behavior.

Summarized, the presence of reactants C-1 and/or D-1, namely the presence of amid or imid structure in the inventive modified poly(acrylic acid), makes it possible, to take significant influence on the kinetic cleavage behavior of cleavable side groups. This is due to side group effects of the amide or imide structure to cleavable ester groups.

Hence, it is a specific aspect of this invention, that variation of at least one of the reactants B-1, C-1 and D-1, more preferred a variation of reactants C-1 and D-1 influence the hydrolysis kinetics of the cleavable side groups. At least some of the above mentioned properties of the polymers synthesized according to Area I, Area II or Area III can be influenced and so enhanced, that preferred polymers with long shelf lifes, and preferred polymers with special slump increasing properties are achieved.

DETAILED DESCRIPTION OF THE INVENTION

The invention is based of extensive studies of modified poly(acrylic acid)s having polyalkyleneglycol side chains, which are connected to the poly(acrylic acid) backbone via ester, amide or imide bonds, and, optionally, which include amide or imide structures based on primary or secundary amines.

In particular, the synthesis of the modified poly(acrylic acid)s, i.e. the kinetics of the synthesis, has intensively been studied in order to achieve polymers that are differently performing in concrete, and that are obtainable based on one composition of reactants only by varying the reaction time. Due to distinction of the polymer analogous condensation into three Areas I, II and III three differently performing polymers based on one composition of reactants can be achieved. In concrete, polymers according to Area I show suitability for precast due to high water reduction. In concrete, polymers according to Area II show suitability for readymix due to high water reduction and good slump life, and polymers according to Area III show suitability for slump increasing properties.

Furthermore, it was found that amines used to modify poly(acrylic acid)s influence the hydrolysis kinetics of cleavable groups in the investigated polymers, and that therefore special properties of polymers according to Area I, II and III can be obtained by varying the ratio of reactants A-1, B-1, C-1 and D-1.

The preparation of the inventive modified poly(acrylic acid)s according to Area I, II and III was carried out as described in the reaction scheme below:

Reaction Scheme—Preferred synthesis of the inventive polymers 1 mol of a poly(acrylic acid) of a molecular weight of 1000 to 10'000 is reacted at elevated temperature with o moles polyalkyleneglycol-monoalkylether, p moles of an α-amino-polyalkyleneglycol-ω-alkylether and q moles of a primary or secondary amine in presence of an acid catalyst:

After the end of the reaction, which is detected by the current acid number, the resulting modified poly(acrylic acid)s are received as a melt which solidifies at lower temperatures to an amorphous mass. The modified poly (acrylic acid)s obtainable according to the preceding synthesis can be handled either as solid, as melt, because remelting is easily feasible, or as diluted solution, because either solid or molten modified poly(acrylic acid)s according to this invention are soluble in water to any amounts. The polymer can be stored, transported and applied as a melt, as a solid, or as a solution.

The polymers of this invention are employed either as dispersing agents, in particular polymers according Area I and II, or the inventive polymers, in particular polymers according to Area III, can be used as slump flow increasing agents, to overcome the problem of drop of slump flow over the time.

In a preferred embodiment, the polymers can be used for water reducing applications as single polymers or as mixtures of said inventive polymers according to Area I, II and III. Polymers according to Area III are most preferably used in admixtures as polymer blends. In another preferred embodiment, modified acrylic polymers according to this invention can also be blended with other dispersing admixtures, preferably admixtures selected from the group consisting of sulfonated melamine condensates, sulfonated naphthalene condensates, lignosulfonates, substituted maleamid-vinylcopolymers and acrylic or methacrylic copolymers with polyalkyleneglycol side chains, or mixtures thereof.

Modified acrylic polymers according to this invention, or admixtures comprising same preferably furthermore contain at least one defoaming or antifoaming agent and/or at least one air controlling agent.

A further aspect of the present invention is a mortar, concrete, cement or cementitious binder containing the modified acrylic polymer according to the present invention in an amount of 0.01 to 10% by weight of the binder, said mortar or concrete having a unit content of binder composition of cement or a mixture of cement and latent hydraulic binder and/or inert microscopic powder of 100 to 800 kg/m$^3$ preferably of 250 to 650 kg/m$^3$.

In a preferred embodiment, the cement is selected from the group consisting of Portland cement, white cement, high alumina cement or blended cement, and the latent hydraulic or inert microscopic powder is selected from the group consisting of fly ash, slag, natural pozzolane, silica fume, burnt oil shale, metakaolin or calcium carbonate, or mixtures thereof.

The cement composition of the present invention may further comprise conventional admixtures like plasticizers, superplasticizers, air entraining admixtures, defoamers, retarders, set accelerators, hardening accelerators, hydrophobizing or shrinkage reducing admixtures or corrosion inhibitors.

Still a further embodiment of this invention is an aqueous slurry of microscopic powders containing the modified acrylic polymers according to this invention, or a mixture thereof, in an amount of 0.01 to 10% by weight of the binder. Most preferred is, that the microscopic powder is calcium carbonate, gypsum or gypsum based.

The inventive admixture could be used in liquid form or as a powder form and could be added before, during or after the grinding operation of the cement or the cementitious binder.

EXAMPLES

In the following examples, the synthesis of the inventive polymers usable in admixtures for dispersing and/or slump increasing properties that are also an object of the present invention is explained in more detail by means of the examples E1-E16, H1-H2 and the mixtures of different example polymers M1-M6. All polymer solutions were adjusted to 40% solid content.

In test example 1 polymers are synthesized according to the Areas I, II and III and their different properties were tested in mortar. In test example 2 blends of polymers synthesized according to the Areas I and III were tested in mortar. In test example 3 the influence of reactants C-1 or D-1 to the kinetic behavior of cleavage ester side groups is demonstrated.

Polymers E1, E5, E9 and E13 are synthesized according Area I, polymers E2, E3, E6, E7, E10, E11, E14 and E15 are synthesized according Area II and polymers E4, E8, E12 and E16 are synthesized according Area III. The number average molecular weight of the inventive polymers was determined by size exclusion chromatography using polyethyleneglycol standards considering only the polymer peak.

Example E1 to E4

(Polymer E1 to E4)

160 g of an aqueous solution of a partly neutralized 4000 molecular weight poly(acrylic acid) and 7.5 g 50 wt. % sulfuric acid were placed in a glass reactor fitted with a thermometer, stirrer, a gas inlet tube and a distillation assembly. The solution was heated to 70° C. and 360 g of a 1000 number average molecular weight polyethyleneglycol-monomethylether and 30 g of a 1000 number average molecular weight α-amino-polyethyleneglycol-ω-methylether were added.

The mixture was heated up under a steady stream of nitrogen and kept at 165° C. After 2 h (E1), 4 h (E2), 6 h (E3) and 8 h (E4) stirring at 165° C. samples were taken. Each sample was cooled down to 90° C. and, finally, water was added to obtain a 40 wt.-% solution.

TABLE 1

Polymer examples E1–4

| Example No. | Reaction time (h) | Final acid number (mg KOH/g) | $M_n$ | Polymer content of resulting aq. solution |
|---|---|---|---|---|
| E1 | 2 | 78.6 | 10400 | 40 ± 1 |
| E2 | 4 | 67.9 | 11300 | 40 ± 1 |
| E3 | 6 | 62.3 | 13600 | 40 ± 1 |
| E4 | 8 | 57.8 | 13100 | 40 ± 1 |

Example E5 to E8

(Polymer E5-E8)

160 g of an aqueous solution of a partly neutralized 4000 molecular weight poly(acrylic acid) and 7.5 g 50 wt. % sulfuric acid were placed in a glass reactor fitted with a thermometer, stirrer, a gas inlet tube and a distillation assembly. The solution was heated to 70° C. and 360 g of a 1000 number average molecular weight polyethyleneglycol-monomethylether and 6.48 g of 3-(2-methoxyethoxy)-propyl-amin were added.

The mixture was heated up under a steady stream of nitrogen and kept at 165° C. After 2 h (E5), 4 h (E6), 6 h (E7) and 8 h (E8) stirring at 165° C. samples were taken. Each sample was cooled down to 90° C. and, finally, water was added to obtain a 40 wt.-% solution.

TABLE 2

Polymer examples E5–8

| Example No. | Reaction time (h) | Final acid number (mg KOH/g) | $M_n$ | Polymer content of resulting aq. solution |
|---|---|---|---|---|
| E5 | 2 | 79.7 | 9700 | 40 ± 1 |
| E6 | 4 | 66.8 | 11100 | 40 ± 1 |
| E7 | 6 | 59.5 | 12100 | 40 ± 1 |
| E8 | 8 | 54.4 | 13000 | 40 ± 1 |

Example E9 to E12

(Polymer E9 to E12)

160 g of an aqueous solution of a partly neutralized 4000 molecular weight poly(acrylic acid) and 7.5 g 50 wt. % sulfuric acid were placed in a glass reactor fitted with a thermometer, stirrer, a gas inlet tube and a distillation assembly. The solution was heated to 70° C. and 400 g of a 1000 number average molecular weight polyethyleneglycol-monomethylether was added.

The mixture was heated up under a steady stream of nitrogen and kept at 165° C. After 2 h (E9), 4 h (E10), 6 h (E11) and 8 h (E12) stirring at 165° C. samples were taken. Each sample was cooled down to 90° C. and, finally, water was added to obtain a 40 wt.-% solution.

TABLE 3

Polymer examples E9–12

| Example No. | Reaction time (h) | Final acid number (mg KOH/g) | $M_n$ | Polymer content of resulting aq. solution |
|---|---|---|---|---|
| E9 | 2 | 75.7 | 11100 | 40 ± 1 |
| E10 | 4 | 69 | 11500 | 40 ± 1 |
| E11 | 6 | 56.7 | 13500 | 40 ± 1 |
| E12 | 8 | 56.5 | 13400 | 40 ± 1 |

Example E13 to E16

(Polymer E13 to E16)

160 g of an aqueous solution of a partly neutralized 4000 molecular weight poly(acrylic acid) and 7.5 g 50 wt. % sulfuric acid were placed in a glass reactor fitted with a thermometer, stirrer, a gas inlet tube and a distillation assembly. The solution was heated to 70° C. and 360 g of a 1000 number average molecular weight polyethyleneglycol-monomethylether and 4.2 g of 1,4-Oxazinan were added.

The mixture was heated up under a steady stream of nitrogen and kept at 165° C. After 2 h (E13), 4 h (E14), 6 h (E15) and 8 h (E16) stirring at 165° C. samples were taken. Each sample was cooled down to 90° C. and, finally, water was added to obtain a 40 wt.-% solution.

TABLE 4

Polymer examples E13–16

| Example No. | Reaction time (h) | Final acid number (mg KOH/g) | $M_n$ | Polymer content of resulting aq. solution |
|---|---|---|---|---|
| E13 | 2 | 74.6 | 10200 | 40 ± 1 |
| E14 | 4 | 68.5 | 11200 | 40 ± 1 |
| E15 | 6 | 59.5 | 11600 | 40 ± 1 |
| E16 | 8 | 58.4 | 15500 | 40 ± 1 |

Example H1

(Polymer H1)

160 g of an aqueous solution of a partly neutralized 4000 molecular weight poly(acrylic acid) and 7.5 g 50 wt. % sulfuric acid were placed in a glass reactor fitted with a thermometer, stirrer, a gas inlet tube and a distillation assembly. The solution was heated to 70° C. and 360 g of a 1000 number average molecular weight polyethyleneglycol-monomethylether and 12 g dicyclohexylamine were added.

The mixture was heated up under a steady stream of nitrogen and kept at 165° C. After 2 h stirring at 165° C. the acid number achieved a value of 62.8 and the mixture was cooled down. At 90° C. 667 g of water was added to obtain a 40%-solution.

Example H2

(Polymer H2)

160 g of an aqueous solution of a partly neutralized 4000 molecular weight poly(acrylic acid) and 7.5 g 50 wt. % sulfuric acid were placed in a glass reactor fitted with a thermometer, stirrer, a gas inlet tube and a distillation assembly. The solution was heated to 70° C. and 395 g of a 1000 number average molecular weight polyethyleneglycol-monomethylether were added.

The mixture was heated up under a steady stream of nitrogen and kept at 165° C. After 2 h stirring at 165° C. the acid number achieved a value of 62.8 and the mixture was cooled down. At 90° C. 702 g of water was added to obtain a 40%-solution.

TABLE 5

Polymer examples H1–H2

| Example No. | Reaction time (h) | Final acid number (mg KOH/g) | $M_n$ | Polymer content of resulting aq. solution | Cleavable ester groups in mmol/g polymer |
|---|---|---|---|---|---|
| H1 | 2 | 62.8 | 10600 | 40 ± 1 | 0.7925 |
| H2 | 2 | 62.8 | 10600 | 40 ± 1 | 0.845 |

Test Examples

The test examples 1 and 2 were performed to demonstrate the properties of the polymers synthesized according to Area I, II and III, namely polymers with fluidizing effects (Area I and II) and polymers with slump flow increasing properties (Area III). The inventive polymers were tested in mortar, in admixtures as individual polymers (Area I, II and III) and as polymer blends (Area I and III).

Test example 3 shows the influence of amides according to reactants C-1 and D-1 on the kinetic behavior of the hydrolyzation of the cleavable ester groups.

Test Example 1

The workability of concrete or mortar dependent on the use of one or more of the inventive polymers and comparative polymers was tested. The consistency of freshly prepared mortar, i.e. the mobility and viscosity, is the most important characteristic of workability. The consistency of freshly prepared mortar was investigated as mortar shows good correlation to concrete.

TABLE 6

Composition of the fresh mortar mixtures

| Components | Quantity in kg |
|---|---|
| Normal Portland Cement, Type 1. (EU 197-1) | 1.0 |
| lime stone filler | 0.2 |
| sand 0 to 1.2 mm* | 1.267 |
| sand 1.2 to 4 mm* | 1.067 |
| sand 4 to 8 mm* | 1.667 |
| Total water (mixing water and water of the co-polymer solution) | 0.42 |
| Inventive polymers or comparative polymer, g solid | 0.004 |

*washed and dried

The filler, sand and cement were blended in a Hobart type mortar mixer for 60 seconds then the water containing the admixtures was added and the mortar mechanically kneaded for 3 minutes.

The consistency was determined by using a "flow table spread" test according to DIN 18555, part 2. The diameters of the spread mortar was measured in two directions and the average value was regarded as flow value. The measurement was repeated after 30 and 60 minutes with 30 seconds mixing of the mortar. The change of the flow value with time is a measure for the loss of fluidity of the mortar.

For the freshly prepared mortar, the fluidizing effect is dependent on the dosage of the superplasticizer. Usually, from 0.2 to 1.5% solid matter quantities (in dissolved form), referred to the weight of cement, are added. To a high degree, the effect is also dependent on the chemical structure and the molecular weight of the polymer, which is forming the basis of the fluidizer. In particular, in this invention the reaction time according to the Areas I, II and III shows a significant influence on the fluidizing effect of the inventive polymers.

In order to demonstrate increased effectiveness of the inventive copolymers, the flow behavior of mortar mixtures containing polymers E1 to E16 were measured as mentioned.

TABLE 7

Mortar tests of example polymers E1–E16

| Test Mixture No | Polymer example * | Dosage in % of cement weight | Flow table spread in mm, x minutes after mixing | | | Compressive strength in Newton/$mm^2$, y days after mixing | | %-Air content of fresh mix |
|---|---|---|---|---|---|---|---|---|
| | | | x = 0 | 30 | 60 | y = 1 | 7 | |
| 1 | E1 | 0.83 | 219 | 186 | 144 | 26.3 | 51.4 | 2.9 |
| 2 | E2 | 0.83 | 205 | 211 | 191 | 25.1 | 46.3 | 2.4 |
| 3 | E3 | 0.83 | 176 | 211 | 205 | 25.3 | 47.1 | 3.0 |
| 4 | E4 | 0.83 | 146 | 194 | 211 | 25.1 | 48 | 4.1 |
| 5 | E5 | 0.83 | 212 | 175 | 135 | 27.2 | 46.6 | 3.4 |
| 6 | E6 | 0.83 | 220 | 214 | 214 | 25.9 | 48.3 | 6.8 |
| 7 | E7 | 0.83 | 141 | 184 | 173 | 26.1 | 48.7 | 3.2 |
| 8 | E8 | 0.83 | 134 | 188 | 208 | 28.0 | 48.5 | 3.5 |
| 9 | E9 | 0.9 | 232 | 226 | 202 | 23.7 | 47.2 | 11 |
| 10 | E10 | 0.9 | 206 | 232 | 247 | 23.4 | 49.6 | 6.0 |
| 11 | E11 | 0.9 | 176 | 242 | 234 | 21.9 | 44.8 | 7.4 |
| 12 | E12 | 0.9 | 175 | 237 | 232 | 23.9 | 49.7 | 4.8 |
| 13 | E13 | 0.9 | 252 | 235 | 226 | 19.7 | 45.1 | 6.0 |
| 14 | E14 | 0.9 | 238 | 243 | 236 | 21.7 | 48.5 | 4.5 |
| 15 | E15 | 0.9 | 185 | 241 | 238 | 22.3 | 49.6 | 5.8 |
| 16 | E16 | 0.9 | 156 | 239 | 237 | 21.5 | 47.6 | 4.9 |

*all polymers are defoamed with 0.2% triisobutyl phosphate

Test Example 2

Test example 2 shows the effectiveness of blends of inventive polymers according to Area I and III. Different ratios of inventive polymers were used in the polymer blends. All tests were carried out as mentioned in Test example 1.

TABLE 8

Mortar tests of example polymers E1, E4 and E5, E8 and blends thereof and E5, E8 and blends thereof

| Test Mixture No | Polymer example | Polymers mixed | Ratio of polymer mix | Dosage in % of cement weight | Flow table spread in mm, x minutes after mixing | | | Compressive strength in Newton/mm$^2$, y days after mixing | | %-Air content after mix |
|---|---|---|---|---|---|---|---|---|---|---|
| | | | | | x = 0 | 30 | 60 | y = 1 | 7 | |
| 17 | E1 | — | — | 0.9 | 252 | 244 | 225 | 26.3 | 51.4 | 5.7 |
| 18 | M1 | E1/E4 | 1/3 | 0.9 | 197 | 247 | 250 | 24.4 | 46.6 | 4.4 |
| 19 | M2 | E1/E4 | 1/1 | 0.9 | 236 | 240 | 234 | 24.4 | 49.0 | 3.8 |
| 20 | M3 | E1/E4 | 3/1 | 0.9 | 247 | 245 | 232 | 26.0 | 49.9 | 4.8 |
| 21 | E4 | — | — | 0.9 | 179 | 234 | 239 | 25.1 | 48.0 | 5.5 |
| 22 | E5 | — | — | 0.9 | 246 | 212 | 174 | 27.2 | 46.6 | 6.0 |
| 23 | M4 | E5/E8 | 1/3 | 0.9 | 177 | 246 | 227 | 25.8 | 46.7 | 4.7 |
| 24 | M5 | E5/E8 | 1/1 | 0.9 | 209 | 234 | 229 | 26.0 | 49.7 | 4.2 |
| 25 | M6 | E5/E8 | 3/1 | 0.9 | 230 | 223 | 193 | 26.6 | 45.4 | 4.6 |
| 26 | E8 | — | — | 0.9 | 157 | 225 | 223 | 28.0 | 48.5 | 5.4 |

*all polymers and polymer blends are defoamed with 0.2% triisobutyl phosphate

Test Example 3

Test example 3 was performed to demonstrate the influence of amid/imide structures to the hydrolysis behavior of cleavable ester groups in the modified poly(acrylic acid)s of this invention. Therefore, the pH value was adapted to a comparable value as concrete, i.e. 12-14. Under this alkaline conditions cleavable ester groups will hydrolyze, which can be detected by back titration with diluted HCl solution and a pH indicator.

The procedure was performed as followed: In a flask 50 g of a 40 wt-% of modified poly(acrylic acid) of this invention, 50 g pure water and 30 droplets of a 1 wt.-% phenolphthalein solution were mixed at room temperature. Afterwards, the solution was neutralized with 1 N aqueous NaOH solution. Under stirring 100 g of an 0.1 N aqueous NaOH solution was added so that the solution became red. The flask was closed to avoid evaporation.

At certain times a sample consisting of 20 g of the solution was taken and 0.1 n HCl was added dropwise until the solutions became colorless. Table 9 shows the results of this experiment.

TABLE 9

Hydrolysis of cleavable ester groups of polymer with (H1) and without (H2) reactant D-1

| Time (h) | Polymer H1, consumed 0.1 N HCl solution | Polymer H2, consumed 0.1 N HCl solution | Polymer H1, percentage of cleaved ester groups | Polymer H2, percentage of cleaved ester groups |
|---|---|---|---|---|
| 1.0 | 0.1 | 1.5 | 0.8 | 11.7 |
| 2.5 | 0.3 | 1.8 | 2.1 | 13.7 |
| 3.5 | 0.8 | 1.9 | 6.7 | 14.5 |
| 4.0 | 0.8 | 2.1 | 6.7 | 16.0 |
| 5.0 | 0.9 | 2.2 | 7.5 | 16.8 |
| 8.0 | 1.1 | 2.5 | 8.8 | 19.2 |
| 12.0 | 1.3 | 2.8 | 10.5 | 21.9 |
| 20.0 | 1.6 | 3.4 | 13.4 | 26.2 |
| 40.0 | 2.1 | 3.9 | 17.2 | 30.5 |
| 66.0 | 2.3 | 4.4 | 19.3 | 34.0 |

While there are shown and described presently preferred embodiments of the invention, it is to be distinctly understood that the invention is not limited thereto but may be otherwise variously embodied and practised within the scope of the following claims.

What is claimed is:
1. A modified acrylic polymer obtained by reacting
   (A) a poly(acrylic acid) with endgroups resulting from initiators and/or chain transfer agents that are inert for condensation reactions, said poly(acrylic acid) A-1 having a number average molecular weight of from 500 to 20,000

A-1 and
   (B) o molar parts of a monofunctional polyalkyleneglycol-monoalkylether B-1

$$HO-(A-O)_r-(B-O)_sR^1 \quad \text{B-1}$$

optionally
   (C) p molar parts of a monofunctional α-amino-polyalkylenglycol-[]-alkylether C-1

$$H_2N-(A-O)_t-(B-O)_uR^1 \quad \text{C-1}$$

and optionally
   (D) molar parts of a primary or secondary amine D-1

D-1 wherein R represents a hydrogen atom or a methyl group, or a mixture thereof;
M represents a hydrogen atom, a $C_1$–$C_5$ alkyl group or an alkali metal, an alkaline earth metal or other two or three valent metal atoms, an ammonium or organic ammonium group, or a mixture thereof;

each $R^1$ independently from each other is a $C_1$–$C_4$ alkyl group; A and B represent alkylene groups with 2–4 C-atoms, the mixture of (A-O) and (B-O) is formed by either random addition or block addition, and (A-O)± (B-O);

$R^2$ and $R^3$ independently from each other represent a hydrogen atom, or an aliphatic, cycloaliphatic, araliphatic or aromatic group, or $R^2$ and $R^3$ together with the nitrogen atom to which they are bound form a morpholine or imidazole ring system, or another ring systems containing at least one further hetero atom; or $R^2$ and $R^3$ independently from each other represent oxyalkylene groups of the structure $R^5$—(O—$R^6$)$_v$—, wherein $R^5$ represents a $C_1$–$C_4$ alkyl group and O—$R^6$ represents an oxyalkylene group with 2 to 4 carbon atoms, whereby within the same structure $R^5$—(O—$R^6$)$_v$—, O—$R^6$ optionally represents more than one kind of oxyalkylene group, wherein the mixture maybe is formed by either random addition or block addition;

wherein a molar ratio of
  a:o:p:q=1:(0.1–0.95):(0–0.6):(0–0.6), and
wherein p+q<0.9, and
o+p+q≦a;
r, s, t, u and v independently represent integers from 0–250;
r+s >1;
t+u>1;
in the presence of a catalyst at elevated temperatures
wherein the degree of reaction is influenced by the ratio of A-1, B-1 and/or and optionally C-1 and optionally D-1 and the temperature, in which the reaction can be followed by decrease of the acid number over time, in which the reaction can be stopped at different reaction times resulting in polymers with different properties, said reaction is stopped
  I. at a high slope of decrease of the acid number over the time resulting in polymers with a high initial water reduction of >20% and a decreasing slump flow over time
  or
  II. at a medium slope of decrease of the acid number over time resulting in polymers with a high or medium initial water reduction of at least 10% and a constant slump flow over the time or
  III. at a slope of decrease or no decrease of the acid number over time resulting in polymers with a medium or low initial water reduction of at most 20% and an increasing slump flow over the time.

2. A modified acrylic polymer, obtained by the reaction defined in claim 1 which is composed of m molar units of the group given by formula A below, o molar units of the group given by formula B below, optionally p molar units of the group given by formula C below, and optionally q molar units of the group given by formula D below, whereby:

A

COOM

-continued

B

C

D wherein R represents a hydrogen atom or a methyl group, or mixture thereof;

M represents a hydrogen atom, a $C_1$–$C_5$-alkyl group or an alkali metal, an alkaline earth metal or other two or three valent metal atoms, an ammonium or organic ammonium group, or a mixture thereof;

each $R^1$ independently from each other is a $C_1$–$C_4$ alkyl group A and B represent alkylene groups with 2–4 C-atoms, the mixture of (A-O) and (B-O) is formed by either random addition or block addition, and (A-O)± (B-O);

$R^2$ and $R^3$ independently from each other represent a hydrogen atom, or an aliphatic, cycloaliphatic araliphatic or aromatic group or $R^2$ and $R^3$ together with the nitrogen atom to which they are bound form a morpholine or imidazole ring system, or another ring systems containing at least one additional hetero atom; or $R^2$ and $R^3$ independently from each other represent oxyalkylene groups of the structure $R^5$—(O—$R^6$)$_v$—, wherein $R^5$ represents a $C_1$–$C_4$ alkyl group and O—$R^6$ represents an oxyalkylene group with 2 to 4 carbon atoms, whereby within the same structure $R^5$—(O—$R^6$)$_v$—, O—$R^6$ optionally represents more than one kind of oxyalkylene group, wherein the mixture is formed by either random addition or block addition;

r, s, t, u and v independently represent integers from 0–250; r+s>1;
t+u>1;
m, o, p, q are numerical values representing the molarity of the constituent units A,
B, C and D present in the polymers, in a proportion of
  m:o:p:q=(0.05–0.9):(0.1–0.95)(0–0.6)(0–0.6)
  and wherein p+q<0.85,
  and m+o+p+q=1.

3. The modified acrylic polymer according to claim 1, wherein the number average molecular weight is from 4000 to 100,000.

4. The modified acrylic polymer according to claim 1, obtained by a synthesis wherein the reactant A-1 has a number average molecular weight of from 1000 to 10,000.

5. The modified acrylic polymer according to claim 1, obtained by a synthesis wherein the reactant B-1 has a number average molecular weight of from 250 to 10,000 and the reactant C-1 has a number average molecular weight of from 250 to 10,000.

6. The modified acrylic polymer according to claim 1, obtained by reacting reactants A-1 and B-1, and optionally C-1 and optionally D-1 in the presence of an acid catalyst at a temperature of about 140° C. to 250° C.

7. The modified acrylic polymer according to claim 1, obtained by a synthesis that is carried out using inert organic solvents as carrier.

8. The modified acrylic polymer according to claim 1, obtained by using reactants A-1 and B-1, and optionally C-1 and optionally D-1, whereby the reaction was stopped at a slope of the decrease of the acid number over the time resulting in a polymer with a high initial water reduction of $\geq 20\%$ and a decreasing slump flow over time, which can be used especially for precast applications.

9. The modified acrylic polymer according claim 1, obtainable by using reactants A-1 and B-1, and optionally C-1 and optionally D-1, whereby the reaction was stopped at a slope of the decrease of the acid number over the time resulting in a polymer with a high or medium initial water reduction of at least 10% and a constant slump flow over time, which can be used especially for readymix applications.

10. The modified acrylic polymer according to claim 1, obtainable by using reactants A-1 and B-1, and optionally C-1 and optionally D-1, whereby the reaction was stopped at a slope of the decrease of the acid number over the time to linear behavior resulting in a polymer with a medium or low initial water reduction of at least 20% and an increasing slump flow over time, which can be used especially for slump flow increasing applications.

11. The modified acrylic polymer according to claim 1, wherein $p+q\pm 0$.

12. An admixture in liquid or solid form comprising at least one modified acrylic polymer according to claim 1.

13. The admixture of claim 12, which comprises at least two modified acrylic polymers in various ratios resulting in an admixture with high water reduction and constant slump flow over time.

14. The admixture of claim 12 further comprising dispersing agents selected from the group consisting of sulfonated melamine condensates, sulfonated naphthalene condensates, lignosulfonates, substituted maleamid-vinyl-copolymers and acrylic or methacrylic copolymers with polyalkyleneglycol side chains, and mixtures thereof.

15. A mortar, concrete, cement or cementitious binder, containing at least one modified acrylic polymer according to claim 1 in an amount of 0.01 to 10% by weight of the binder, said mortar or concrete having a unit content of binder composition of 100 to 800 kg/m$^3$, whereby said binder composition is selected from the group consisting of a cement, a mixture of cement, a latent hydraulic powder, a mixture of latent hydraulic powders, and mixtures thereof optionally together with one or more inert microscopic powder(s).

16. The mortar, concrete, cement or cementitious binder according to claim 15, wherein the cement is selected from the group consisting of Portland cement, white cement, high alumina cement, blended cement, and mixtures thereof, and the latent hydraulic or inert microscopic powder is selected from the group consisting of fly ash, slag, natural pozzolane, silica fume, burnt oil shale, metakaolin calcium carbonate, and mixtures thereof.

17. The mortar, concrete, cement or cementitious binder according to claim 15, wherein the admixture in liquid or powder form containing the modified acrylic polymers is added before, during or after the grinding operation of the cement or the cementitious binder.

18. An aqueous slurry of microscopic powder containing a modified acrylic polymer according to claim 1, or a mixture thereof, in an amount of 0.01 to 10% by weight of the binder.

19. The aqueous slurry of microscopic powder according to claim 18, wherein the microscopic powder is calcium carbonate, gypsum or gypsum based.

20. The modified acrylic polymer according to claim 1, whereby at least 0.5 mole-% of B-1 is represented by a structure in which A represents an alkylene group with 2 C-atoms and s=0, or in which B represents an alkylene group with 2 C-atoms and r=0.

21. The modified acrylic polymer according to claim 1, whereby 5–100 mole-% of B-1 is represented by a structure in which A represents an alkylene group with 2 C-atoms and s=0, or in which B represents an alkylene group with 2 C-atoms and r=0.

22. The modified acrylic polymer according to claim 1, whereby at least 0.5 mole-% C-1 is represented by a structure in which A represents an alkylene group with 2 C-atoms and u=0, or in which B represents an alkylene group with 2 C-atoms and t=0.

23. The modified acrylic polymer according to claim 1, whereby 5–100 mole-% C-1 is represented by a structure in which A represents an alkylene group with 2 C-atoms and u=0, or in which B represents an alkylene group with 2 C-atoms and t=0.

24. The modified acrylic polymer according to claim 1, wherein the molar ratio a:o:p:q=1:(0.1–0.95):(0–0.3):(0–0.3).

25. The modified acrylic polymer according to claim 1, wherein the molar ratio a:o:p:q=1:(0.1–0.95):(0–0.1):(0–0.1).

26. The modified acrylic polymer according to claim 1, wherein p+q<0.6.

27. The modified acrylic polymer according to claim 1, wherein p+q<0.3.

28. The modified acrylic polymer according to claim 2, whereby at least 0.5 mole-% of B is represented by a structure in which A represents an alkylene group with 2 C-atoms and s=0, or in which B represents an alkylene group with 2 C-atoms and r=0.

29. The modified acrylic polymer according to claim 2, whereby 5–100 mole-% of B is represented by a structure in which A represents an alkylene group with 2 C-atoms and s=0, or in which B represents an alkylene group with 2 C-atoms and r=O.

30. The modified acrylic polymer according to claim 2, whereby 0.5 mole-% of the formula C is represented by a structure in which A represents an alkylene group with 2 C-atoms and u=0, or in which B represents an alkylene group with 2 C-atoms and t=0.

31. The modified acrylic polymer according to claim 2, whereby 5–100 mole-% of the formula C is represented by a structure in which A represents an alkylene group with 2 C-atoms and u=0, or in which B represents an alkylene group with 2 C-atoms and t=0.

32. The modified acrylic polymer according to claim 2, wherein m:o:p:q=(0.05–0.9):(0.1–0.95):(0–0.3):(0–0.3).

33. The modified acrylic polymer according to claim 2, wherein m:o:p:q=(0.05–0.9):(0.1–0.95):(0–0.1):(0–0.1).

34. The modified acrylic polymer according to claim 2, wherein p+q<0.6.

35. The modified acrylic polymer according to claim 2, wherein p+q<0.3.

36. The modified acrylic polymer according to claim 11, wherein

0<p+q<0.85.

37. The modified acrylic polymer according to claim 11, wherein

0<p+q<0.6.

38. An admixture in liquid or solid form comprising at least one modified acrylic polymer according to claim 8.

39. The modified acrylic polymer according to claim 1, wherein p+q<0.1.

40. The modified acrylic polymer according to claim 1, wherein p+q<0.02.

41. The modified acrylic polymer according to claim 1, wherein p+q<0.01.

42. The modified acrylic polymer according to claim 2, wherein p+q<0.1.

43. The modified acrylic polymer according to claim 2, wherein p+q<0.02.

44. The modified acrylic polymer according to claim 2, wherein p+q<0.01.

45. The modified polymer according to claim 1, wherein the molar ratio a:o:p:q 1:(0.1–0.95):(0–0.02):(0–0.02).

46. The modified acrylic polymer according to claim 1, wherein the molar ratio a:o:p:q=1:(0.1–0.95):(0–1.01)(0–0.01).

47. The modified acrylic polymer according to claim 2, wherein the molar ratio a:o:p:q=1:(0.1–0.95):(0–0.02):(0–0.02).

48. The modified acrylic polymer according to claim 2, wherein the molar ratio a:o:p:q=1:(0.1–0.95):(0–0.01):(0–0.01).

49. The modified acrylic polymer according to claim 1, derived from polyacrylic acid, polyethyleneglycol-monoethylether and dicyclohexyl amine.

* * * * *